United States Patent [19]
Bennett et al.

[11] Patent Number: 5,335,112
[45] Date of Patent: Aug. 2, 1994

[54] REMOTE AREA LANDING SYSTEM

[75] Inventors: Reginald S. Bennett, Toronto; Gary Hretsina, Ajax, both of Canada

[73] Assignee: RB-Maxim Visual Aids Ltd., Ajax, Canada

[21] Appl. No.: 930,802

[22] Filed: Aug. 17, 1992

Related U.S. Application Data

[63] Continuation-in-part of Ser. No. 775,751, Oct. 15, 1991, Pat. No. 5,223,977, which is a continuation-in-part of Ser. No. 617,766, Nov. 26, 1990, Pat. No. 5,115,343, Continuation-in-part of Ser. No. 507,840, Apr. 12, 1990, abandoned, which is a continuation-in-part of Ser. No. 469,376, Jan. 24, 1990, abandoned.

[51] Int. Cl.5 ............................................. G02B 5/124
[52] U.S. Cl. ................................... 359/530; 359/527; 340/947
[58] Field of Search ............... 359/515, 527, 530, 531, 359/546, 547, 529; 340/947-948, 951-953, 982, 985; 362/153.1, 157, 183-184, 194-195

[56] References Cited

U.S. PATENT DOCUMENTS

| | | | |
|---|---|---|---|
| 2,325,258 | 1/1943 | Mallory | 340/948 |
| 3,117,299 | 1/1964 | Lemm et al. | 340/948 |
| 3,235,838 | 2/1966 | Hilt | 340/948 |
| 4,590,471 | 5/1986 | Pieroway et al. | 340/947 |
| 4,868,567 | 9/1989 | Eichweber | 340/953 |
| 5,022,739 | 6/1991 | Bennett et al. | 359/546 |
| 5,032,961 | 7/1991 | Pouyanne et al. | 362/251 |
| 5,138,488 | 8/1992 | Szczech | 359/530 |

*Primary Examiner*—Loha Ben
*Assistant Examiner*—James Phan

[57] ABSTRACT

A remote area landing system combines retro reflective markers with a lighting system. The markers reflect light from a landing aircraft or helicopter. The preferred marker is aluminum with a polycarbonate cover layer. The lights are solar powered and are radio controlled from the aircraft.

7 Claims, 4 Drawing Sheets

REMOTE AREA LANDING SYSTEM

This is a continuation-in-part of application 07/775,751 filed Oct. 15, 1991, now U.S. Pat. No. 5,223,977, which is a continuation-in-part of application 07/617,766 filed Nov. 26, 1990, now U.S. Pat. No. 5,115,343. The latter application is a continuation-in-part of application 07/507,840 filed Apr. 12, 1990 which in turn is a continuation-in-part of application 07/469,376 filed Jan. 24, 1990, both abandoned.

This invention relates to a landing control system for remote areas and to equipment for use therewith.

By 'aircraft' herein I include fixed wing aircraft and helicopters.

By 'strobes' I mean strobe lights.

Prior applications 07/775,751 and 07/617,766 (whose contents are incorporated herein by reference) have disclosed a marker and a pylon, respectively, with retroreflective surfaces thereon designed to assist fixed wing aircraft and helicopters in locating remote landing areas and/or in indicating for such craft the desired azimuthal and descent approach path to the area. The devices described in the above recited applications have been very useful in assisting the landing of aircraft in remote areas where a proper runway or landing area marking is permanently or temporarily absent. Such use has been usually at night but the markers described have been useful in the daytime also.

Such retroreflective system has been useful for location and indicating at remote areas. However the useful range using such retroreflection (the aircraft provides the light which is retroreflected) is about 2–3 miles. It is thus considered important to combine such marker and such system with a light system which would allow the location of the remote landing site to be identified from the aircraft at a distance of about 9 miles. The lighting system must be from storage batteries since the invention is required where conventional hydro electric systems are not available to provide regular airport lighting. The invention is also useful in such applications as a backup system at an established airport for use in the event of power interruption or for marking emergency or temporary routes.

In one aspect the invention is a broad combination comprising a system employing: the basic combination of a retroreflective marker or markers to provide to an aircraft location and direction, information about a remote landing site when illuminated by light from the aircraft; and a normally off, battery energized, lighting system which is actuable by a predetermined radio signal from the aircraft.

Preferably in the basic combination, the radio signals from the aircraft will be a series of pulses within a predetermined time interval, rather than a single pulse or signal to avoid accidental actuation.

Preferably, in the broad combination, a plurality of retroreflective markers are provided adapted to indicate the desired azimuthal and the desired descent directions. Such retroreflective markers are preferably selected to give substantial retroreflection for rays incident on the retroreflectant surface over a wide range of angles to the normal but to give better retroreflection when the incident ray is normal to the reflectant surface. This assists the pilot of the aircraft in determining that he is on the correct azimuthal and descent path.

As stated previously, the electrical energy for the lighting must come from storage batteries since the combination will be mainly useful where hydro electric supplies are not available or for temporary or emergency use in hydro serviced locations. Accordingly the preferred form of the combination provides electrical energization based on the provision of a battery charged by a bank of solar cells and operable through a control system which on the one hand detects the radio signal pulses signalling the request for illumination and on the other hand switches it on and maintains it for a predetermined period of time, energized for these purposes by the storage battery. In a preferred aspect of the invention, the control, actuable by aircraft radio signals as described, is provided with a manual override. Thus in the event a pilot is without the requisite transmitter or in the event of receiver or transmitter failure, the manual override may be used to put on the lights for the benefit of the pilot in need.

In a preferred aspect of the basic combination the markers are covered with cube-corner cavity reflectant material which has, as described, the quality that its retroreflectivity is higher for incident light normal to the retroreflecting surface than at other angles. Preferably the cube corner cavity retroreflectant material is a polycarbonate reflective tape. Of such polycarbonate tapes the most suitable is a cube corner reflectant tape made by the Reflexite Corporation of New Britain Conn. under the trademark REFLEXITE.

The characteristics of such cube corner cavity material are discussed in U.S. Pat. Nos:

2,380,447: Jungerson;
3,712,706: Stamm;
3,684,348: Rowland;
3,810,804: Rowland;
4,025,159: McGrath;
4,202,600: Burke;

The teachings of the above patents are incorporated herein by reference.

In particular the invention preferably makes use of cube corner reflective sheeting as described in the Burke patent U.S. Pat. No. 4,202,600 where regular arrays of cube corner reflectors in sheets are arranged in zones (indistinguishable to the user) oriented relative to adjacent zones in such a way that retroreflective intensity variation with azimuthal angle (measured in the plane of the sheet), is reduced at high angles of incidence to the normal to the sheet.

By an array is meant an ordered group of cube corner triads. A 'zone' is the area occupied by such an array.

In general the preferred form of marker is that described in prior application 07/775,751 whose disclosure is incorporated herein by reference. The disclosure includes that of a marker having two sloping planar panels 30 which converge at twice the descent angle of a fixed wing aircraft (4°–12°) or helicopters (16°–20°) so that they may be arranged with both sides normal to the desired descent angle, i.e. (2°–6°) for fixed wing aircraft or (8°–10°) for helicopters. Such markers may thus be oriented about a vertical axis to indicate the azimuthal direction of approach, (which corresponds to the vertical plane through the normal), and levelled to indicate the angle of descent as indicated by the normal.

Such markers have leading and trailing panels. The leading panel 30 with it cover layer 32F is oriented to face the approaching aircraft. The trailing panel is also useful to assist the pilot in identifying the landing site. The two panels can of course be of different colors so that the trailing edge panel will indicate to the pilot that he is approaching from the wrong direction. If desired the trailing edge panel may be omitted.

The panels are preferably made from aluminum covered with retroreflectant material in the form of polycarbonate tape and this is of considerable importance in a marker for remote areas since the range of temperatures in which such markers may be used may be from −50° C. to +50° C. It is found that the aluminum has a similar coefficient of expansion to polycarbonate tape and in particular to Reflexite so that the tendency of the tape to peel or wrinkle on the panel is lessened. The aluminum so used may be, and usually will be, an alloy, and by 'aluminum' when used in the specification and claims herein I mean aluminum or aluminum alloys.

In drawings which illustrate a preferred embodiment of the invention:

Figure 6:
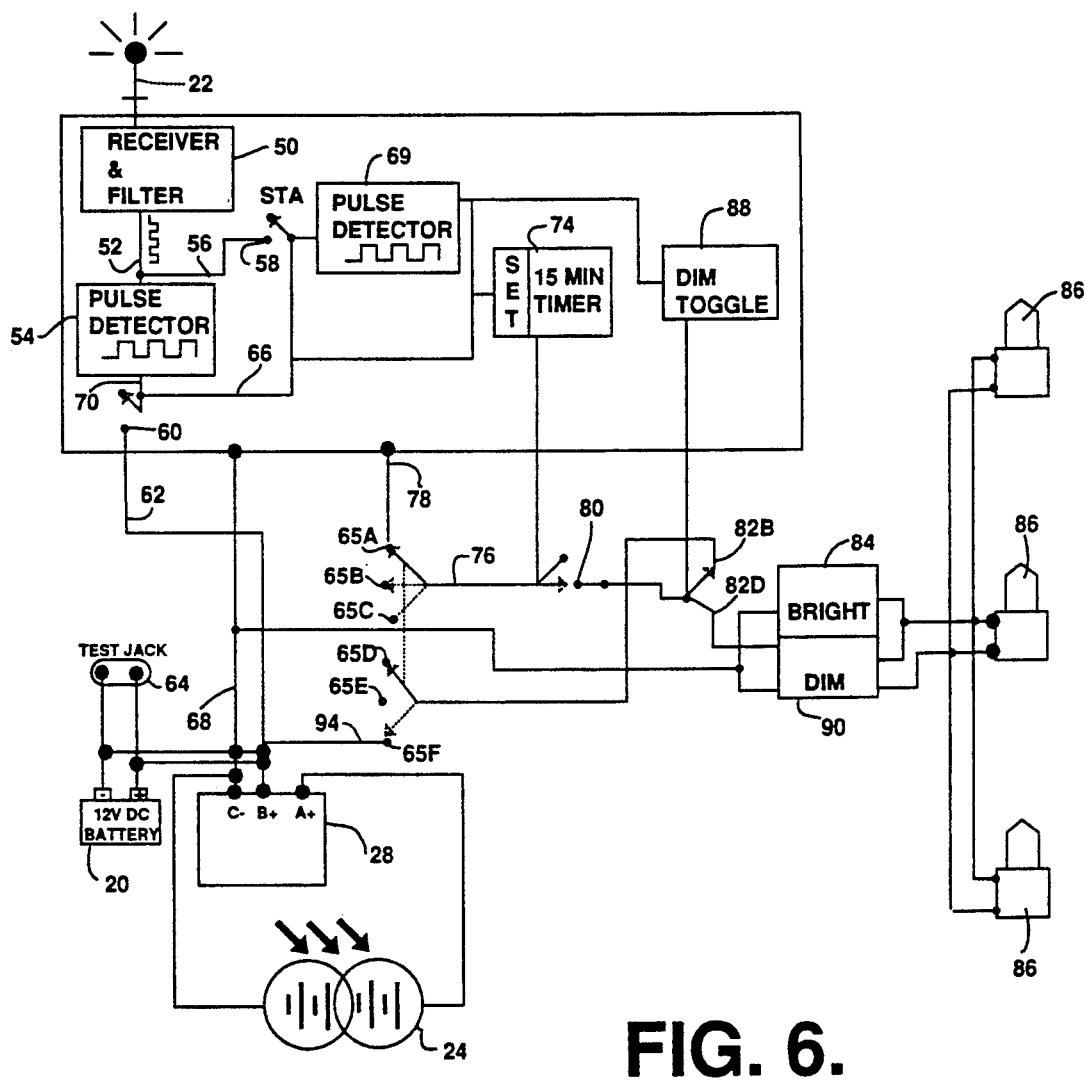

FIG. 6 indicates the circuit for the lighting of the system.

Figure 1:
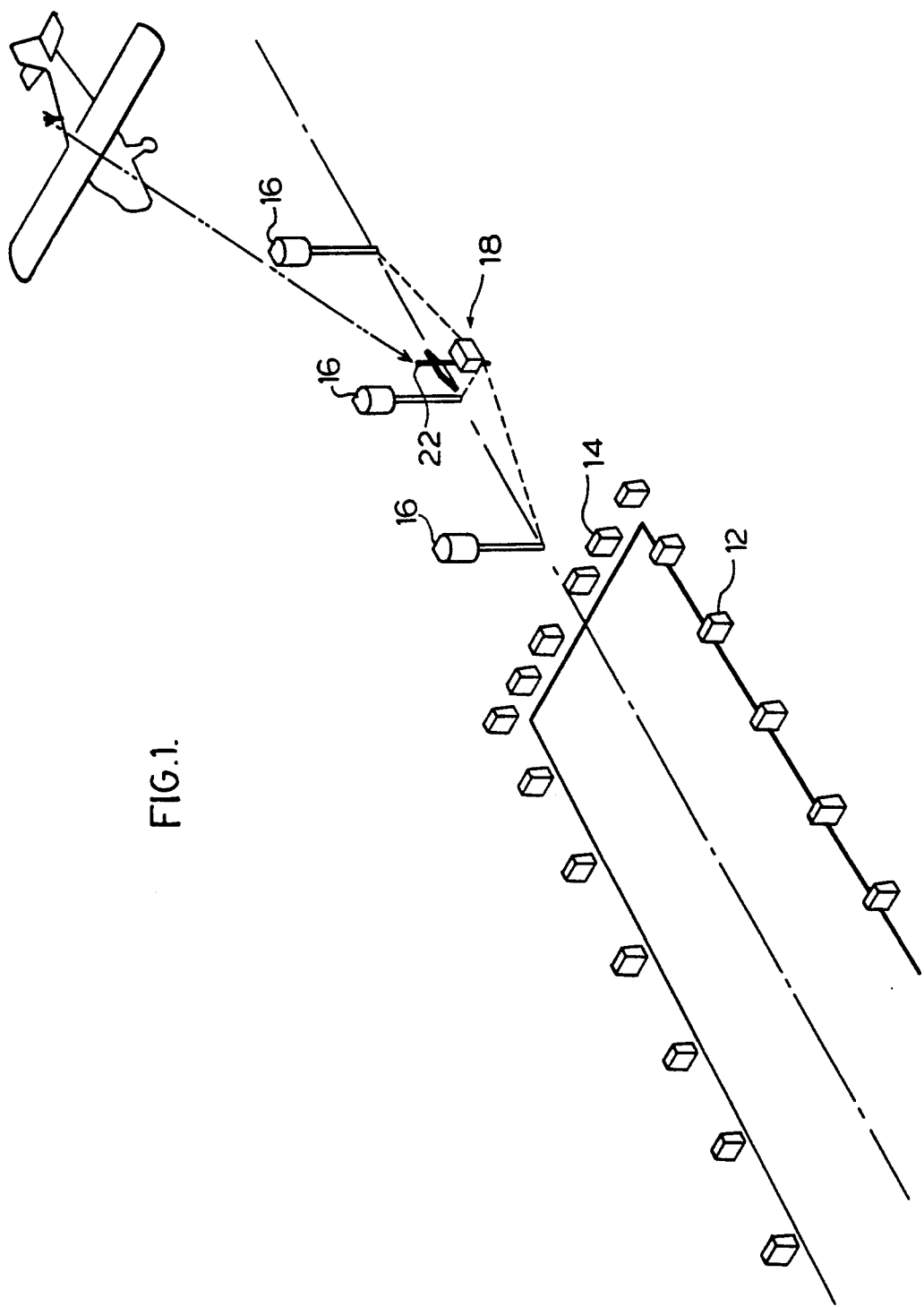
FIG. 1 is a schematic perspective showing an aircraft approaching a runway using the inventive system.
Figure 2:
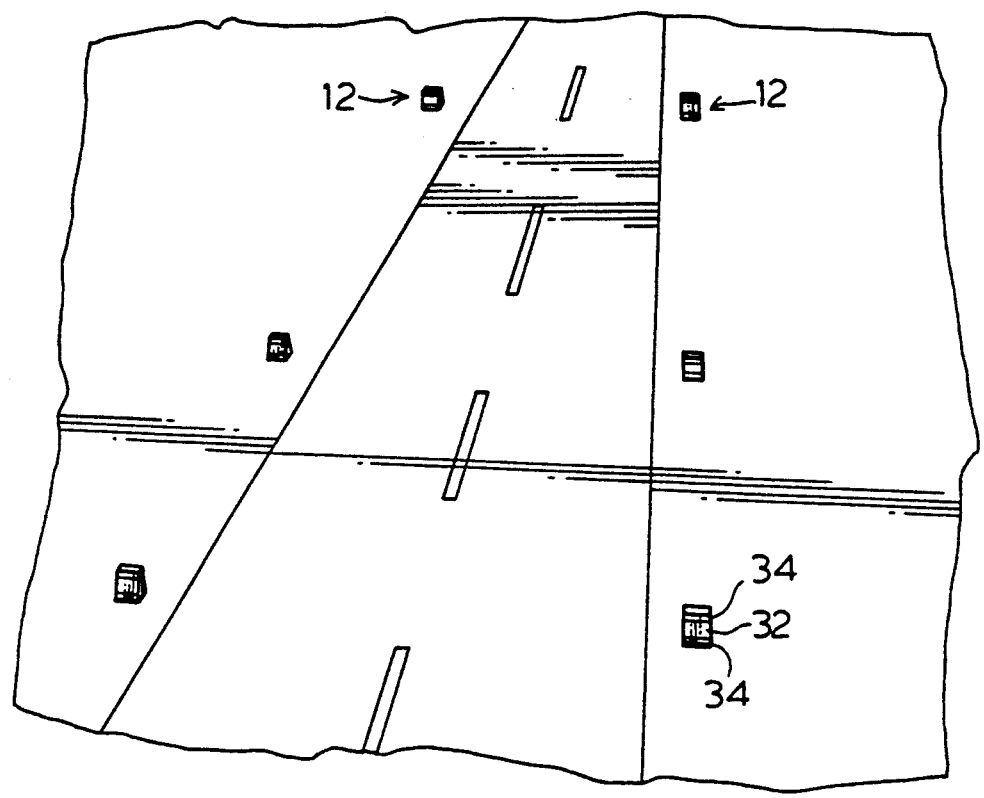
FIG. 2 shows a portion of such runway.
Figure 3:
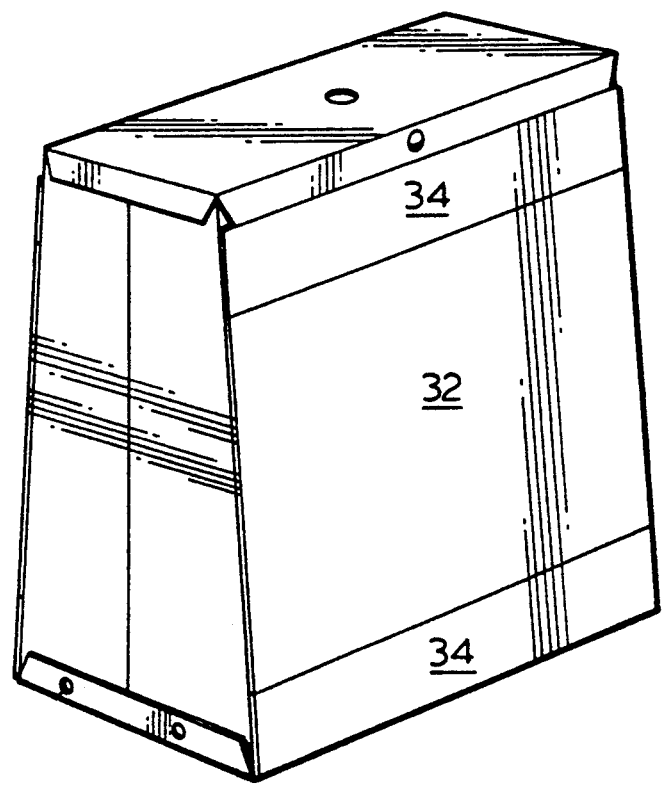
FIG. 3 is a perspective view of a marker.

FIG. 1 shows the end of a runway. The sides of the runway are marked by suitably spaced retroreflective markers 12 and generally similar retroreflective markers 14 may mark the end of the runway. Aligned with the runway are a plurality, here 3, of lights, preferably strobe lights 16 at suitable spacing, preferably 60 yard intervals. The lights are controlled by the assembly 18 which, as hereinafter described includes: the antenna 22, battery 20 for powering the lights 16, the solar cell 24, for powering the battery 20, the voltage regulator 28 for regulating the output of the solar cell, the control system 23 (FIG. 6) for controlling the lights responsive to signals received by the antenna.

The markers 12 and 14 (described in full in application Ser. No. 07/775,751) are structurally made of aluminum sheet, preferably include a pair of outwardly facing panels 30 which, with the marker levelled, slope inward at 2°–6° to the vertical for fixed wing aircraft and 8°–10° for helicopters. Each panel 30 is preferably covered over a central area with retroreflecting Reflexite tape 32. Preferably a strip of self adhering fluorescent tape 34 borders the tape 20 above and below tape 32.

Normally the pair of inwardly outwardly facing panels are 'toed in' that is the vertical planes normal to the panels are not parallel but intersect at an angle greater than 0° and less than 3° (preferably 1°). Such toed in panels may be placed along the sides of the runway with those panels which face the landing being 'toed in'. This provides the brightest retroreflectant indication to a pilot landing along the centre line of the runway and thus tends to guide the pilot to this location.

The marker when properly levelled thus provides, for daytime use, the panels with two horizontal stripes 34 which assist the pilot in locating the runway and its azimuthal orientation and give a horizontal indication in direction perpendicular to the runway. The bars 22 do not of course strongly retroreflect nor do they give the pilot an indication of whether he is descending at the correct angle. They are however useful in the daytime when the retroreflectant material is relatively dull under solar or ambient light illumination in all directions but those normal to incident light.

The cube corner cavity retroreflectant tape 'Reflexite' covering the main area of the two panels has two important qualities. The material's ability to give night retroreflection at relatively wide angles to the normal to the panel plane allows the pilot to locate the landing location. The stronger retroreflection when the pilot is on his correct descent path acts as an indicator to help him to reach and maintain the correct descent path.

The color of the retroreflectant panels 12 and 14 may be chosen as desired. However some of the markers (here those 14 at the end of the runway may be differently colored on opposite sides to indicate to the pilot on which direction he is approaching the runway.

Preferably the planar panels are 'toed in' toward each other so that the vertical planes, normal to the panels are at an angle of between 0° and 3°. The advantage of the toed-in arrangement, the 'toed in' markers when correctly oriented in azimuth tend to retroreflect from each side of the runway more strongly toward an aircraft approaching along the centre of the runway axis, than if the panels were not toed-in.

Figure 4:
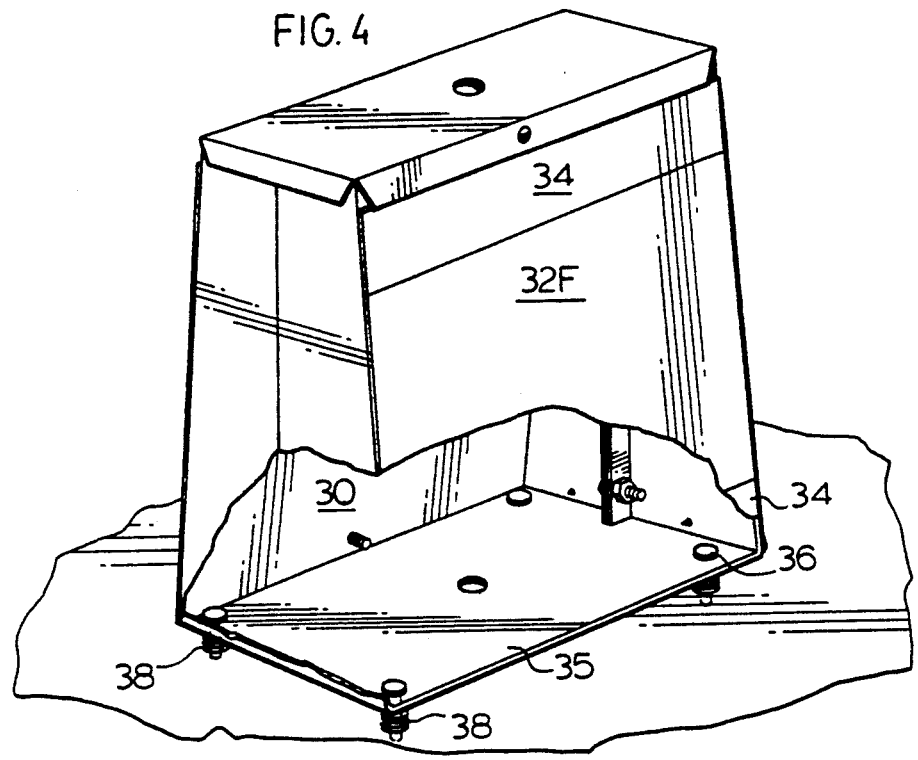
FIG. 4 is a broken view of a marker.
Figure 5:
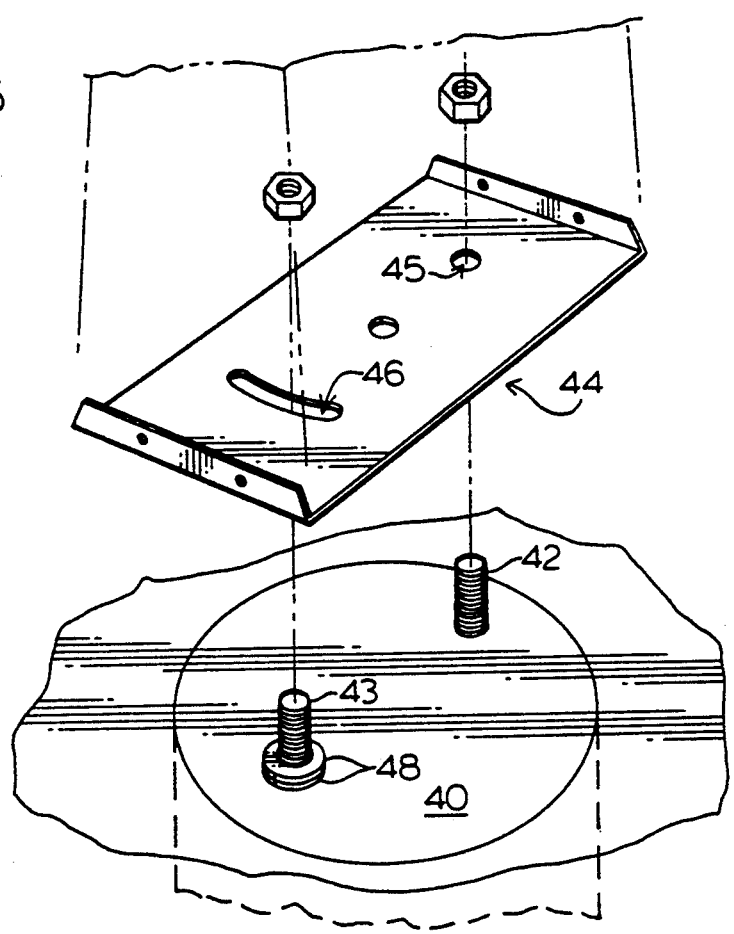
FIG. 5 is a detail of part of a marker.

FIG. 4 shows a marker with its base 35 anchored by four spikes 36. Thus the base may be arranged in the correct azimuthal orientation with its forward face 32F facing the aircraft approach path (subject to the toed-in as discussed). The marker may then be levelled by the use of the desired number of shim washers schematically shown at 38 fitted on the spikes, as required. The body of the marker is then installed on base 35. A more elaborate orienting and levelling system is shown in FIG. 5 where a poured concrete foundation 40 mounts a pair of upwardly projecting bolts 42, and 43. The marker base 35 of FIG. 4 is replaced by base 44 which provides aperture 45 to receive bolt 42 and an arcuate slot 46, concentric with aperture 44 to slidably receive bolt 43. In use the base 44 is installed with aperture 45 and slot 46 receiving the respective bolts. The base is rotated about bolt 42 to determine the correct azimuthal orientation and temporarily removed and replaced to install washer shims 48 on one of the bolts 42 and 43 until base 44 is levelled. The body of the marker 12 or 14 is then attached to the base. Shims may also be inserted under one side or the other of base 44 if levelling requires a tilt about the axis joining bolts 42 and 43, and aperture 45 is made large enough to allow this. However this will not be required if base 40 is level.

In FIG. 6, which schematically represents the control systems, the heavier lines represent control paths and the lighter lines represent conductors.

The lighting system comprises an antenna 22 for receiving the signal generated by the approaching aircraft, It is assumed that it is desireable to provide a selected frequency for actuation of the lighting. The selected frequency will probably be in the aircraft band and between 116 and 128 MHz. If desired a different frequency could be selected for each of a number of remote locations. (Such frequencies may not be arbitrarily chosen but are customarily allocated by the Federal communications authority of the country involved). In any event the operation of the system will be initiated by the pilot switching to the desired frequency and sending a series of pulsed signals at the selected frequency, such as by a series of depressions of his microphone switch. A series of signal pulses (say 3) within a 5 second interval is preferred because otherwise a chance or random signal might accidentally actuate the lighting system. Such signal pulses must be long enough for the detection equipment used and for the expected equipment should have a duration of about one third of a second.

The controller operation will preferably be in accord with the Federal Aviation Agency (FAA) specifications L-854, Part 3.4.5 (style A decoder). The runway lights are operated by microphone clicks from incoming aircraft traffic. The pilot must select the channel frequency of the light control radio receiver 22,50 (FIG. 6). The pilot must select the channel frequency of the receiver 22,50 and must be provided with this information in his briefing and navigation aids. The frequency will also be indicated on a label on the receiver 22,50.

Accordingly, the control for illumination comprises a receiver and filter 50 to receive from the ground antenna 22, the radiated signal.

'Strobe' is used herein as an abbreviation for strobe light.

The control circuit 23 is provided with power from battery 20 along positive line 87 to control circuit terminal 81 and along negative line 68 to control circuit terminal 83. The detailed circuitry whereby the power at terminals 81 and 83 is supplied to the components of control circuit 23 is not shown as well known to those skilled in the art.

The receiver is combined with a filtering device so that the pulses passed along line 52 are only derived from received signals of the desired frequency. Line 56 connects line 52 to pulse detector 69 Pulse detector 54 is responsive to a predetermined sequence (we prefer 3 pulses within a five second interval or 'window') to provide a control signal along line 70 to close switch 60 to 60B to connect positive line 62 to terminal 65A of a manual switch 65 which is normally in the position shown. A control signal on line 67 is supplied along line 72 to set timer 74 to time a 15 minute interval. Positive battery power is supplied over lines 87 and 62 to contact 60B of relay 60. The relay was initially open at 60A but, when later closed carries the positive battery power along: line 66, line 78, contact 65A, of relay 65, line 76, over the contacts of normally closed contacts 80A of relay 80 over the contact 82B of relay 82 along line 89 to the 'Bright' control 84 for the strobe lights 86. The negative power line 88 is, at the same time, connected to the bright strobe control 84 and the dim strobe control 90.

Accordingly in the simplest phase of the operation of the strobes, the requisite signal produced by depression of the aircraft's mike switch three times in 5 seconds switches on the strobes 86 from their 'bright' power supply 84 to guide the pilot toward the landing strip or area. If no more signals are provided by the pilot the bright strobe lights will remain for a predetermined period, here 15 minutes, after which the relay 80 will be opened by control 74 to extinguish the strobes and re open contacts 60B and 58B. Control 74 will be adapted on extinguishment, (by means not shown) to reset all circuits in the control system. When illuminated the strobes are preferably controlled to flash once each second. After the strobes are extinguished they may be re-lit by a further three pulses in 5 seconds, detected by detector 54 since the above cycle will be repeated. If three pulses in 5 second window are received during the first or any succeeding 15 minute interval pulse detector 54 will reset timer along line 67 but switch 60 will remain closed at 60B until the lights are extinguished.

If 5 pulses are received during a 5 second window, the first three (of the 5) pulses will be detected at detector 54 to reset the 15 minute interval but will leave switch 60 closed. The 5 pulses will also be detected by detector 69 which will send a signal to, Bright Dim toggle 88.

Bright-Dim toggle would have been originally set to have contacts 82B closed so that initially the lights are on 'Bright'.

On detection of the 5 pulse group Bright-Dim toggle 88 switches the relay 82 to open contacts 82B and close contacts 82D to disconnect positive power from the 'bright' control 84 and connect it to the dim controls 90. This switches the strobes from bright to dim so that the pilot is not blinded on his landing approach. If no further signals are received from the pilot, the lights will be extinguished when the timer opens contacts 80A at the end of the new 15 minute interval. On any extinguishment the system is designed, by conventional means, not shown, to reset all relays and controls to their starting position. If during the timed period when the lights are on 'dim' a further 5 pulses in 5 seconds from the pilot is detected at detector 69, detector 69 will actuate the toggle 88 to switch switch 82 to illuminate the 'bright' control and at the same time the 15 minute timer will be reset by detector 54. Thus the pilot may alternate bright and dim intervals for as long as he wants.

Any variants on the signalling system are considered within the scope of the invention. Enhancements may be added. For example a light powered by battery 20 may be provided to illuminate a windsock or windcone for the pilot's assistance. A further detector may be provided (say) to detect seven pulses within the five second window to illuminate the windsock and this may be coordinated with the controls shown, as desired. For example it may be arranged that the windsock illumination comes on when the lights 86 are set to dim or another relationship will be used. The seven pulses would reset the 15 minute interval. The windcone light is extinguished and its controls reset with the rest of the control circuit when the end of a 15 second interval extinguishes lights 86.

A ganged three position manual switch 65 has contacts 65A, 65B, 65C ganged with terminals 65D, 65E, 65F. When contacts 65A are connected to line 76 and contacts 65D are connected to line 96, positive line 78 is connected to power one of the strobe controls and line 96 is disconnected. When contacts 65B and 65E are connected to lines 76 and 96, respectively, the lines 76 and 96 are disconnected and the strobes are extinguished. When the contacts 65C and 65F are connected to lines 76 and 96 respectively the control circuit 23 is disconnected from line 76 but positive power on line 96 is connected on line 89 directly to 'bright' control 84, illuminating the strobes. This direct connection of power to the strobes may be used to test the battery and the strobe circuit. It may also be used to manually light the strobes in situations where the pilot does not have the equipment or the ability to operate the strobes or in situations where the control is not operable.

The illumination circuit includes a battery 20 and test jack 64 connection for testing it. A solar panel 24 feeds a solar panel voltage regulator 28 and the output is connected across the battery terminals to maintain the latter charged. The battery output is also connected to the power input terminals 81 and 83 of the control 26. Negative line 68 from the battery is connected through line 88 to the strobe light controllers 84 and 90 as shown. The positive battery lead 87 is connected along line 94 to terminal 65F of the three position switch 65.

The ganged terminals 65B, 65F of the three position switch represent the 'off' position.

The strobe controls 84 and 90 and their associated strobe lights 86 may be any conventional design. We prefer to use controls and strobes manufactured by Applied Strobe Technology of Niagara Falls Canada. Their model AST-12 was adapted at our request to provide the alternatively selectable bright and dim controls 84 and 90.

Each strobe is preferably designed to send a burst of light each second. Although the strobes are shown connected in parallel under common controls, it is well within the scope of the invention and of conventional skills to connect the strobes with independent controls or with a control or coordinated control adapted to cause them to flash in sequence.

In operation then, the operator at the remote location may, at any time, test the strobes by moving the three position switch 65 to contacts 65C, 65F. This setting may also be used in emergencies where the control system (or pilot radio) is or becomes inoperative, so that, in spite of this, the strobe lights identify the landing area.

When not on manual setting 65C, 65F the switch 65 will, in operation be set on contact 65A, 65D. However the strobes will not be lit since switch 60 will be at open contact 60A. When the pilot believes he is within about 9 miles of the remote location he will set his transmitter to the designated frequency for the receiver 50 and rapidly depress and release his microphone to send out the predetermined member of pulses, (here 3 pulses in 5 seconds). The aircraft radio circuitry, in accord with techniques well known to those skilled in the art, is designed so that each microphone switch depression results in a pulse transmission at the selected radio frequency. Such pulses are detected by the receiver and, being of the correct frequency, are passed by the receiver and filter 50 to the pulse detector 54. On detecting the predetermined signal the detector 54 signals along the line 70 to close switch 60 at contacts 60B to power 'bright' strobe control positive terminal 84 since switch 80 is closed to contacts 60B and switch 82 is at contact 82B. At the same time the pulse detector 54 will signal timer 74 over line 67 to cause the timer to commence timing a 15 minute interval.

If no further pulse signal is received during the 15 minute interval then, at the end of such interval, timer 74 will open switch 80 extinguishing the strobes and resetting the all control circuitry and relays by conventional means, not shown. However the extinguished strobes may be turned on for a further 15 minute period if the pilot repeats his 3 pulses in 5 seconds signal causing a repetition of the above cycle.

If during the initial (or a later) 15 minute interval the pilot sends 3 (but less than 5) pulses in a 5 second window detector 54 will reset timer 74 to start a further 15 minute interval, leaving switch 60 closed at 60B to maintain lights 86.

If during the initial or a later 15 minute interval 5 pulses in the 5 second window are received detector 69 will detect this and switch toggle 88 to its other state. Thus if the 5 pulses are received when lights 86 are on 'bright' switch 82 will be switched to put them on dim, and vice versa. Detection of 5 pulses mean that detector 54 will detect the first 3 and restart the timer 74 along line 67 while leaving switch 60 closed at 60B.

Toggle 88 is thus connected to switch 82 to change its state with each actuation of the toggle. Thus initially switch 82 will be connected to contact 82B to illuminate lights 86 from Bright control 84. With the lights 012 Bright a signal from detector 69 will cause the toggle to change switch 82 from 'Bright' to dim opening contact 82B and closing contact 82C. Accordingly if the pilot, during the 15 minute 'dim' lit period, again wishes the bright illumination, he again sends 5 pulses in a 5 second interval, switching on the bright illumination. The pilot may thus switch from 'bright' to 'dim' illumination back and forth as he pleases. When the strobes are finally allowed to be extinguished by timer 74 the control system and all relays are designed to reset in preparation for the next landing.

The control system and detectors may be designed for any other pulse per time interval combination. The strobe flashing may be set to any other rate and for a different duration. The control circuit may be provided for additional pulse actuation to allow either the 'bright' or 'dim' illumination period to be continued without restarting. The solar cell and regulator is a commercially available unit and we prefer to use those made by Solarex of Rockville, Md.

Although a particular lighting system and strobe lights are shown, any lighting system of sufficient intensity and controllable by controls of the type described and any light type actuable by a pilot initiated signal is within the scope of the invention.

We claim:

1. Remote area landing system comprising in combination:
   a plurality of markers adapted to be located adjacent a landing area, adapted to retroreflect light incident thereon;
   said markers being arranged to define a landing location;
   each of said markers having a panel bearing cube corner reflectant sheeting;
   a lighting system adapted to indicate the presence of said landing area;
   an antenna;
   means responsive to receipt of a predetermined radio signal by said antenna to turn on said lighting system
   wherein said signal responsive means comprises:
   a storage battery connected to power said lighting system;
   a solar cell connected to charge said battery;
   a control adapted to activate said lighting system;
   an antenna;
   said control being connected to receive the signal from said antenna, and responsive to a component of predetermined frequency therein, to cause illumination of said lighting system.

2. Remote area control system as claimed in claim 1 wherein said means is responsive to a predetermined plurality of pulses of predetermined frequency in less than a predetermined interval.

3. A remote landing system as claimed in claim 2 wherein a plurality of markers are provided to define said landing direction and including a retroreflectant panel adapted to be oriented to define a descent angle.

4. A remote landing system as claimed in claim 1 wherein said lighting system comprises a plurality of lights spaced along a path leading to the landing location.

5. Remote area landing system as claimed in claim 1 wherein said marker provides a retroreflectant surface oriented to retroreflect best for incident light in an intended azimuthal direction and descent angle.

6. Landing system as claimed in claim 1 wherein said panel comprises an aluminum sheet having thereon, a layer of cube corner retroreflecting tape of polycarbonate film.

7. Method of operating a remote landing area system, comprising:

provinding at least one retroreflective marker located adjacent a landing location arranged to retroreflect incident light approximately along a predetermined direction, providing a light system adjacent said landing location, responsive to an incident radio signal of predetermined frequency causing illumination of said lighting system, and responsive to a further incident radio signal during the time said lighting system is providing illumination, causing dimming of said illumination.

* * * * *